United States Patent [19]

Hillekamp

[11] Patent Number: 4,552,732
[45] Date of Patent: Nov. 12, 1985

[54] METHOD OF AND AN APPARATUS FOR SCRUBBING PYROLYSIS GASES

[75] Inventor: Klaus Hillekamp, Munich, Fed. Rep. of Germany

[73] Assignee: Deutsche Kommunal-Anlagen Miete GmbH, Munich, Fed. Rep. of Germany

[21] Appl. No.: 522,748

[22] Filed: Aug. 12, 1983

[30] Foreign Application Priority Data

Aug. 16, 1982 [DE] Fed. Rep. of Germany ....... 3230472

[51] Int. Cl.$^4$ ................................................ C01B 7/00
[52] U.S. Cl. ........................................ 423/210; 55/99; 55/390; 55/474; 423/240
[58] Field of Search ............ 423/240 S, 244 R, 245 S, 423/235, 220, 210 S; 55/474, 390, 99

[56] References Cited

U.S. PATENT DOCUMENTS

| | | | |
|---|---|---|---|
| 620,925 | 3/1899 | Hirt | 55/474 |
| 1,085,712 | 2/1914 | Vander | 55/474 |
| 2,919,174 | 12/1959 | Pring | 423/240 S |
| 3,220,165 | 11/1965 | Howie | 55/474 |
| 3,727,381 | 4/1973 | Kreimann | 55/474 |
| 3,847,094 | 11/1974 | Taeymans et al. | 55/474 |
| 3,918,915 | 11/1975 | Holler | 55/474 |
| 4,038,049 | 7/1977 | Melcher et al. | 55/474 |
| 4,042,667 | 8/1977 | Ishiwata et al. | 423/240 S |
| 4,353,722 | 10/1982 | Berz | 55/474 |
| 4,452,613 | 6/1984 | Littrell | 55/474 |

FOREIGN PATENT DOCUMENTS 2952642  7/1981  Fed. Rep. of Germany .

*Primary Examiner*—T. Tung
*Attorney, Agent, or Firm*—Stevens, Davis, Miller & Mosher

[57] ABSTRACT

A method of and an apparatus for scrubbing pyrolysis gases are disclosed with which a particulate scrubbing agent such as calcium hydroxide is caused to act on the gas which is being passed through a bulk bed filter, preferably of calcium carbonate, the particles of the bulk bed filter being moved continuously.

5 Claims, 1 Drawing Figure

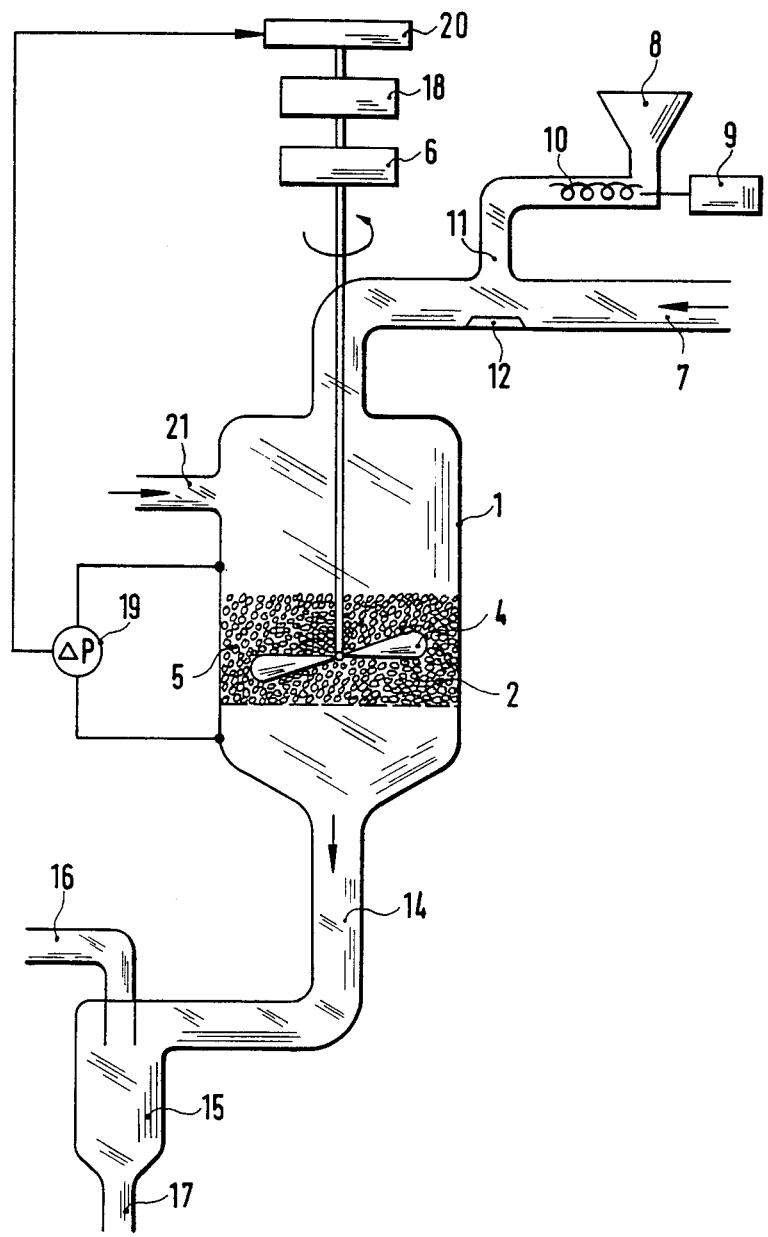

METHOD OF AND AN APPARATUS FOR SCRUBBING PYROLYSIS GASES

The invention relates to a method of and an apparatus for scrubbing pyrolysis gases.

Pyrolysis gases which are produced, for instance, in the pyrolysis of waste matter, such as domestic garbage, special refuse, and sludges normally contain a great variety of impurities or noxious components, particularly dust, chlorine, fluorine, nitrogen, sulfur compositions, and hydrocarbons.

The pyrolysis of plastics, particularly polyvinyl chloride for example yields chlorine compounds.

The scrubbing of pyrolysis gases, also referred to as low temperature carbonization gases causes problems because the gas comprises not only permanent gases but also condensable components, namely different hydrocarbons.

Lowering the temperature of the gases so as to supply them to the conventional scrubbing means will cause those hydrocarbons to condense, forming oils and tars which adhere to the means and plug them. Therefore, the usual scrubbing means cannot be employed.

DE-OS No. 29 52 642 already suggests to scrub pyrolysis gases at high temperature, a scrubbing agent being admitted to the gas, close contact between the gas and the scrubbing agent being established in a ball mill, and the gas finally being passed through a bulk bed filter for separation of the scrubbing agent and any reaction products.

It is disadvantageous with this known procedure that reacted scrubbing agent always remains in the apparatus, that the filtering performance is limited, and that finally regeneration of the bulk bed filters is required.

It is an object of the invention to provide a method and an apparatus suitable for scrubbing pyrolysis gases and characterized by simple mode of operation or structure, respectively, great operational safety, and a high scrubbing effect.

This object is met by a method of scrubbing pyrolysis gases, wherein a particulate scrubbing agent is caused to act on the gas which is being passed through a bulk bed filter, the particles of the bulk bed filter being moved continuously.

The apparatus according to the invention is characterized in that it comprises a means for feeding a scrubbing agent to a stream of pyrolysis gas, a bulk bed filter through which flows the pyrolysis gas to be scrubbed, an agitating means which moves the particles of the bulk bed filter, and, if desired, a dust removing means.

The apparatus according to the invention may be operated without any difficulty at high temperature, namely the temperature at which the pyrolysis gases are produced. Thus the condensation of hydrocarbons contained in the low temperature carbonization gas is avoided and the plant operates safely for long periods of time since no condensation products will stick to it and plug it up.

With the apparatus of the invention clogging and choking of the bulk bed filter by further components of the pyrolysis gas, principally by entrained carbon particcles is avoided by keeping the bulk material constantly in motion.

Preferably, a dust removing means, such as a cyclone or another filter is connected downstream of the filter.

The dust removing means provided separately has the advantage that it may be designed for optimum performance in the dust removal proper as it does not have to fulfill any other tasks with the method according to the invention.

Contrary to a static filter and also as compared to the ball mill specified in DE-OS No. 29 52 642, the bulk bed filter or loose particle layer filter which is kept in motion, as povided by the invention, permits the number of shocks or impacts between the scrubbing agent and the substances to be removed from the pyrolysis gas to be increased by orders of magnitude.

It is obvious that in this manner the scrubbing effect is greatly enhanced.

The bulk bed filter system is self-cleaning. Therefore, the cleaning phase normally required which always involves the passage of noxious components may be dispensed with.

The entire filter uniformly takes part in the scrubbing process whereby a high specific scrubbing efficiency per unit of volume is obtained. Also obtained is a buffer capacity in the filter layer for peak loads of noxious components.

The method of the invention fundamentally is suited to remove any kind of impurities from hot pyrolysis gases, including acid and basic impurities as well as heavy metals. However, the method is especially well adapted for separating the acid impurities from the pyrolysis gas, specifically chlorine, fluorine, and sulfur compounds; chloric gas resulting from the pyrolysis of plastics which contain chlorine, and hydrogen sulfide as well as sulfur dioxide yielded by the pyrolysis of special refuse matter, such as tires and acid resins being the compositions most urgently requiring removal.

The preferred scrubbing agent for removing the acid components, particularly gaseous hydrochloric acid is calcium hydroxide which is used in finely divided form.

The calcium hydroxide is admitted to the stream of pyrolysis gas and turbulent mixing of the gas and scrubbing agent is aimed at so that the desired reaction of the hydrochloric acid with the calcium hydroxide to form calcium chloride and water and of the other components will be initiated and uniform distribution of the scrubbing agent on the bulk bed filter be obtained where the further reaction takes place.

Optimum loading of the gas stream with scrubbing agent is given when the stoichiometric ratio between harmful acid components to be removed, particularly hydrochloric acid and scrubbing agent, preferably calcium hydroxide lies in the range of from 0.25 to 10, preferably 0.5 to 5, i.e. when there is an excess of 0.25 to 10 times of the scrubbing agent.

The dosing of the scrubbing agent may be controlled in response to the content of harmful matter in the pyrolysis gas or pure gas also upon combustion.

The material used for the bulk bed filter may be the customary quartz gravel. Preferably, however, granular basic substances are used, particularly calcium carbonate and calcium oxide. Contrary to quartz, these do not present a dead carrier substance but instead react themselves with hydrochloric acid and other acid components, thus playing an active part in the scrubbing of the pyrolysis gases. Moreover, calcium hydroxide adheres better to calcium carbonate and calcium oxide.

Suitable filter material in general are alkali and alkaline earth compositions, the former particularly comprising alkali carbonate and magnesium carbonate. Also aluminum compounds, specifically aluminum oxide, haematite, phosphates, and acid earths, as well as mixtures thereof may be used.

Preferably, the calcium carbonate is employed in a particle size ranging from 3 to 5 mm. It is especially preferred to use crushed limestone granules, i.e. sharp edged, pointed particles having a rough surface to which the powdery scrubbing agent added will adhere. In this manner the residence time of the scrubbing agent in the bulk bed is prolonged.

It is essential with the method according to the invention that the particles of the bulk bed filter are constantly kept in motion whereby the individual particles of the scrubbing agent will move during the scrubbing process with respect to the gas stream or the particles of the harmful matter or noxious components so as to provide an improved scrubbing effect.

Thus, on the one hand, the bulk material, including the dust and soot it contains as well as the reacted or unreacted scrubbing agent always will be distributed evenly across the filter cross section and no strands or dust concentrations are formed anywhere, and new surfaces are created by the mutual friction of the components in the bulk bed.

Thus in passing the filter layer, the components to be removed always encounter fresh reactive material whereby the separating efficiency of noxious components is greatly improved.

On the other hand, it is essential also that the particles of the bulk bed filter are moved vertically with respect to the filter plane, i.e. that they are raised and dropped. In this manner clogging of the filter by soot, dust, and reaction products is prevented.

Filter bed heights ranging from 50 to 200 mm are preferred.

There is a pressure differential depending on the thickness and density of the filter layer between the filter inlet and the filter outlet ends. This pressure differential may be varied by changing the thickness of the filter bed, i.e. by altering the number of revolutions of the agitating means.

In accordance with a preferred embodiment of the method according to the invention, the pressure differential is kept constant during the entire course, a condition to be achieved, for instance, by controlling the number of revolutions of the agitating means in response to the pressure differential measured. The gas velocity in the filter system then will be constant so that a high number of shocks or impacts between the particles of the scrubbing agent and of the noxious components will be warranted.

The loading of the bulk bed with scrubbing agent is variable within wide limits by dosing and variation of the speed of agitation. This permits adaptation to the content of harmful matter in the gas.

The number of revolutions of the agitating means preferably lies in the range of from 1 to 10 r.p.m.

The fine dust and soot contained in the pyrolysis gas travel slowly through the bulk bed filter and are found in the exiting pure gas. The continuous movement of the filter granules produces a kind of grinding or pulverization process. The tips and edges of the granules are polished off. The fine dust also travels through the filter. Yet the movement of the granules or particles is important especially in view of the fact that the reaction product disposed at the outside, i.e. substantially calcium chloride is rubbed off permanently so that always a fresh contact surface is provided. This fine reaction product which has been freed by the grinding action also travels through the filter.

The gas leaving the filter is pure as regards the substances which were to be removed. Yet it still contains dust from the materials mentioned above. Therefore, it is preferred to have a dust removing means connected downstream of the filter. This again may be a gravel filter. Preferably, however, a cyclone filter is used.

This separation between the reaction area and the area of dust removal has the substantial advantage that the dust removing means may be designed for optimum performance of its task without having to allow for any other factors.

The portion of the filter material entrained by the gas is replaced regularly, either at continuous or discontinuous feeding.

The temperature depends on the temperature of the generation of the gas and normally lies between 250° and 600° C.

As explained, the method of the invention is particularly well suited for removing acid impurities from the pyrolysis gas, calcium hydroxide preferably being used as the scrubbing agent and calcium carbonate as the filter material.

However, other scrubbing agents may be used as well, such as alkali and alkaline earth compositions, specifically calcium carbonate, calcium oxide, alkali carbonates, magnesium carbonate, haematite, aluminum compounds, especially aluminum oxide, and phosphates as well as mixtures of the substances mentioned. Conventional quartz gravel may be used as filter material. Acid earths, e.g. montmorillonite and bentonite may be employed for the removal of basic impurities. The scrubbing agents preferably are powdery.

It is obvious that the movement of the filter bed particles may be effected also in other ways than by agitating or stirring, such as by vibrating motion. What is essential is that the filter material always is distributed uniformly and that also movement of the granules in up and down direction is obtained.

The invention will be described further, by way of example, with reference to the accompanying drawing.

The only FIGURE is a diagrammatic presentation of the apparatus according to the invention.

The pyrolysis gas is introduced through a gas inlet 7 and passed through a bulk bed filter 2 arranged in a housing 1. The scrubbing agent is fed from a scrubbing agent feeder 8 into the gas stream at inlet opening 11, using for instance a feeding screw 10 driven by a motor 9. Baffle elements 12 serve to realize intimate mixing of the scrubbing agent and gas.

The particles 5 of the bulk bed filter 2 are being moved constantly by an agitating means 4 so that their uniform distribution throughout the filter cross section is warranted.

The motor 6 of the agitating means 4 preferably comprises a controllable transmission control of which is effected by a computer 20 and a controller 18. According to a preferred embodiment the method of the invention is carried out at constant pressure drop from the filter inlet end to the filter outlet end, the pressure drop being measured by a pressure gauge 19. The measured value is applied to the computer 20 for control of the number of revolutions of the agitating means 4.

Replacement for filter particles carried out is effected continuously or discontinuously through a filter particle inlet 21. Pure gas is conducted through the outlet 14. Yet it still contains dust particles. These are removed in a dust removing means 15, for instance, a cyclone or multicyclone, and then discharged at 17, whereas the scrubbed gas which also has been freed of dust leaves the apparatus at 16.

The invention will be described in greater detail below with reference to an example.

EXAMPLE

A filter was used which had an inner diameter of 450 mm and a bed height of 150 mm and which was stirred continuously by an agitating means.

White lime was used as filter material.

Calcium hydroxide at a rate of 3000 g of calcium hydroxide per hour was metered continuously from a hopper. The amount of gas sucked through the unit was approximately 885 m$^3$/hr BZ at 430° C. of pyrolysis gas from wood chips to which polyvinyl chloride powder had been added.

The HCl content was measured both at the inlet and outlet of the filter. Measurement of the HCl content was effected by means of two washing bottles upstream of which another bottle was provided with a glass fiber filter to separate the chlorides. The content of the washing bottle was titrated.

The measurement provided 1973.1 mg of HCl/m$^3$ NZ in the untreated gas and 16.5 mg of HCl/m$^3$ NZ in the scrubbed gas. The separating efficiency with respect to HCl thus is 99.2%.

(The above used abbreviations BZ and NZ stand for operating condition and normal condition, respectively).

What is claimed is:

1. A method of scrubbing hot pyrolysis gas comprising introducing a particulate scrubbing agent into a stream of gas to be scrubbed, passing said stream with scrubbing agent downwardly into a bulk bed filter, continuously agitating the particles of the bulk bed filter, withdrawing scrubbed gas from the bulk bed filter and controlling the degree of agitation responsive to the pressure drop in the bulk filter bed.

2. The method as claimed in claim 1, wherein the agitating speed is in the range of from 1 to 10 r.p.m.

3. An apparatus for scrubbing hot pyrolysis gases, comprising a means for feeding a scrubbing agent to a stream of pyrolysis gas, means to convey the gas with scrubbing agent downwardly into a chemically bulk bed filter, a stirring means within said bed for agitating said filter particles, a means for controlling the agitating means, a dust removing means, said stirring means moving the particles of the bulk bed filter continuously in the plane of the filter as well as vertically thereto, means for measuring the pressure drop across the bulk bed filter and means to control the stirring speed activated by said means for measuring the pressure drop across the bulk bed filter.

4. The apparatus as claimed in claim 3, wherein the particles of the bulk bed filter consist of calcium carbonate or calcium oxide and the scrubbing agent consists of powdery calcium hydroxide.

5. The apparatus as claimed in claim 3 or 4, wherein the particles used in the bulk bed filter are sharp edged and have a mean diameter of from 1 to 3 mm.

* * * * *